(12) United States Patent
Blum et al.

(10) Patent No.: US 8,383,724 B2
(45) Date of Patent: Feb. 26, 2013

(54) AQUEOUS COATING COMPOSITION BASED ON A BINDER MIXTURE AS BASE COAT

(75) Inventors: Harald Blum, Leverkusen (DE); Heino Müller, Leverkusen (DE); Heinz Schmidt, Erftstadt (DE)

(73) Assignee: Bayer MaterialScience AG, Leverkusen (DE)

( * ) Notice: Subject to any disclaimer, the term of this patent is extended or adjusted under 35 U.S.C. 154(b) by 751 days.

(21) Appl. No.: 11/974,660

(22) Filed: Oct. 15, 2007

(65) Prior Publication Data

US 2008/0090957 A1  Apr. 17, 2008

(30) Foreign Application Priority Data

Oct. 17, 2006  (DE) .......................... 10 2006 048 926

(51) Int. Cl.
*C08G 18/00* (2006.01)
(52) U.S. Cl. ........ 524/591; 524/501; 524/507; 524/556; 524/590; 528/422; 528/425
(58) Field of Classification Search .................. 524/591, 524/501, 507, 556, 590; 528/422, 425
See application file for complete search history.

(56) References Cited

U.S. PATENT DOCUMENTS

| | | | |
|---|---|---|---|
| 4,237,264 A * | 12/1980 | Noll et al. ....................... 528/67 |
| 4,948,829 A | 8/1990 | Mitsuji et al. |
| 5,075,370 A * | 12/1991 | Kubitza et al. ................ 524/591 |
| 5,569,707 A * | 10/1996 | Blum et al. .................... 524/591 |
| 6,025,031 A * | 2/2000 | Lettmann et al. .......... 427/388.4 |
| 6,077,608 A | 6/2000 | Barkac et al. .............. 428/411.1 |
| 6,168,865 B1 * | 1/2001 | Koster et al. ................... 428/418 |
| 6,277,917 B1 | 8/2001 | Jurgetz et al. ................. 525/125 |
| 6,309,707 B1 | 10/2001 | Mayer et al. .................. 427/386 |
| 2004/0181030 A1 * | 9/2004 | Reidlinger et al. ........... 528/272 |

FOREIGN PATENT DOCUMENTS

| | | |
|---|---|---|
| CA | 2235077 | 4/1997 |
| JP | 01-287183 A | 11/1989 |
| JP | 2005-330339 A | 12/2005 |

* cited by examiner

*Primary Examiner* — Richard A Huhn
(74) *Attorney, Agent, or Firm* — Novak Druce Connolly Bove + Quigg LLP

(57) ABSTRACT

The invention relates to an aqueous coating composition based on a combination of aqueous binders and crosslinker, to a process for preparing it and to use for single-coat or multi-coat paint systems, especially coatings having anti-stonechip properties.

15 Claims, No Drawings

AQUEOUS COATING COMPOSITION BASED ON A BINDER MIXTURE AS BASE COAT

CROSS-REFERENCE TO RELATED APPLICATION

This application claims priority under 35 U.S.C. §119 (a-d) to German application Serial No. 10 2006 048 926.8, filed Oct. 17, 2006.

FIELD OF THE INVENTION

The invention relates to an aqueous coating composition based on a combination of aqueous binders and crosslinker, to a process for preparing it and to use for single-coat or multi-coat paint systems, especially coatings having anti-stonechip properties.

BACKGROUND OF THE INVENTION

In automotive finishing it is common to use a paint system composed of primer, surfacer, base coat and clear coat. Each of the various coats in the paint system has a number of special functions to take on.

The production of such multi-layer coatings, or of individual coats in such multi-layer coatings, has been described in numerous instances in the prior art.

The functions of the surfacer coat include levelling out unevennesses in the bodywork, ensuring effective adhesion to the primer and at the same time, by virtue of the coating's elastic properties, guaranteeing protection from sources of deep-down damage, such as that caused by stonechipping, for example. This surfacer is applied in two coats, with one coat intended to level out unevennesses in the bodywork and the second coat to produce the anti-stonechip properties. In the prior art, however, there have already been descriptions of aqueous surfacer systems which fulfil both requirements with a single surfacer coat.

The base coat, more particularly the metallic base coat, serves for producing good film-optical properties, high gloss levels and pronounced metallic effects of the coating system, and hence ensures an attractive appearance on the part of the painted article.

DE-A 195 42 626, DE-A 196 18 446 and DE-A 44 21 823 as well describe aqueous coating compositions comprising as component (I) a binder mixture composed of acrylate copolymer (A1) in organic solution and/or polyester resin (A2) and/or polyurethane resin (A3) and also as component (II) a non-blocked polyisocyanate crosslinker and as component (III) an aqueous dispersion of components (A1) and/or (A2) and/or (A3) and/or (A4). The systems described therein can be used as top coats, as surfacers or else as automotive refinish paints.

WO-A 98/12001 describes multi-layer coatings having improved anti-stonechip properties, composed of an aqueous base coat and of a special powder clear coat based on a polyacrylate resin capable of migration into the base coat. A disadvantage of this system is that the constituents of the base coat must be very highly compatible with the specific polyacrylates. The properties described therein are achieved only through the combination of an aqueous base coat with a special powder clear coat and through a specific curing method, with preliminary drying of the base coat at 90° C. and subsequent joint baking of base coat and powder clear coat.

There continues to be a need for suitable coating systems to make the painting operation more efficient and to enhance the level of properties of the multi-coat paint finishes.

SUMMARY OF THE INVENTION

It was an object of the present invention, therefore, to provide a binder combination which unites in itself not only the properties of an anti-stonechip surfacer but also the properties of a base coat and which therefore improves the quality of a 4-coat paint system composed of primer, surfacer, base coat and clear coat, or even allows one of the coats in the 4-coat paint system to be dispensed with. The key requirements to be met in this context are not only reliable processing properties but also very good base coat adhesion, effective elasticity and anti-stonechip properties, and also sufficient levelling of surface unevennesses. Further targets include good overcoatability and refinishability, very good film-optical properties such as levelling, metallic effect and DOI values (distinction of image), for example, optimum pigment wetting, and high resistance properties with respect to water, solvents and the effects of environment, light and weathering. It is likewise desirable that the binder combination is sufficiently stable on storage.

Surprisingly it has now been found that aqueous coating compositions which feature a combination of at least two, preferably three aqueous dispersions which are different in chemical structure and of which at least one, preferably two, have groups that are capable of crosslinking, and comprise a crosslinker, have very good anti-stonechip properties.

The present invention provides aqueous coating compositions comprising an aqueous binder mixture A) comprising
A1) 25% to 70% by weight of a secondary, hydroxy-functional polyacrylate dispersion or polyacrylate emulsion,
A2) 5% to 50% by weight of an aliphatic polyurethane dispersion,
A3) 20% to 70% by weight of a hydroxy-functional polyester-polyurethane dispersion composed to an extent of at least 75% by weight of a polyester of molecular weight 500 to 2500 g/mol,
B) and at least one crosslinker,
necessarily including at least two of the three components A1) to A3), and
necessarily including one component A1) and/or A3) in an amount of at least 35% by weight.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The coating compositions of the invention have an organic solvent content of 2% to 12% by weight.

Suitable secondary, hydroxy-functional polyacrylate dispersions A1) are obtained by copolymerizing unsaturated compounds (monomers) in solvents, neutralizing incorporated potentially ionic groups, and dispersing in water.

Examples of monomers suitable for preparing secondary polyacrylate dispersions A1) are carboxy-functional free-radically polymerizable monomers such as acrylic acid, methacrylic acid, β-carboxyethyl acrylate, crotonic acid, fumaric acid, maleic acid (anhydride), itaconic acid or monoalkyl esters of dibasic acids and/or anhydrides, such as monoalkyl maleate, for example. Preference is given to using acrylic acid or methacrylic acid.

Suitable non-functional monomers are cyclohexyl (meth) acrylate, cyclohexyl (meth)acrylates substituted on the ring by alkyl groups, 4-tert-butylcyclohexyl (meth)acrylate, norbornyl (meth)acrylate, isobornyl (meth)acrylate, (meth) acrylic esters with $C_1$-$C_{18}$ hydrocarbon radicals in the alcohol moiety, examples being ethyl acrylate, ethyl methacrylate, n-butyl acrylate, n-butyl methacrylate, isobutyl acrylate, isobutyl methacrylate, 2-ethylhexyl acrylate, methyl methacrylate, 2-ethylhexyl methacrylate, tert-butyl acrylate, stearyl acrylate, stearyl methacrylate, norbornyl acrylate and/or norbornyl methacrylate.

Examples of suitable hydroxy-functional monomers are OH-functional (meth)acrylic esters with $C_1$-$C_{18}$ hydrocarbon radicals in the alcohol moiety, such as hydroxyethyl methacrylate, hydroxypropyl methacrylate, hydroxyethyl acrylate, hydroxypropyl acrylate, hydroxybutyl acrylate or hydroxybutyl methacrylate, for example.

Likewise suitable are hydroxyl monomers containing alkylene oxide units, such as adducts of ethylene oxide, propylene oxide or butylene oxide with (meth)acrylic acid. Preference is given to hydroxyethyl methacrylate and/or hydroxypropyl methacrylate.

Likewise suitable are styrene, vinyltoluene, α-methylstyrene, vinyl esters, vinyl monomers containing alkylene oxide units, such as condensation products of (meth)acrylic acid with oligoalkylene oxide monoalkyl ethers, and also, where appropriate, monomers containing further functional groups, such as epoxy groups, alkoxysilyl groups, urea groups, urethane groups, amide groups or nitrile groups. Vinyl monomers and/or (meth)acrylate monomers with a functionality of two or more as well, such as hexanediol di(meth)acrylate, can be used in amounts of 0% to 3% by weight, based on the sum of the monomers.

Optionally it is also possible to use further monomers. Suitable examples include unsaturated free-radically polymerizable compounds having phosphate and/or phosphonate groups' or sulphonic acid and/or sulphonate groups.

Preferred monomers are methyl methacrylate, styrene, acrylic acid, methacrylic acid, butyl acrylate, butyl methacrylate, tert-butyl acrylate, 2-ethylhexyl acrylate, 2-ethylhexyl methacrylate, hydroxyethyl methacrylate, hydroxypropyl methacrylate, hydroxyethyl acrylate, hydroxypropyl acrylate, hydroxybutyl acrylate or hydroxylbutyl methacrylate.

In the secondary polyacrylate dispersions A) the amount of carboxy-functional monomers is between 0.8% and 5% by weight, preferably 1.2% to 4% by weight, and the amount of hydroxy-functional monomers is between 1% and 45% by weight, preferably 6% to 30% by weight.

Suitable polymerization initiators are peroxy compounds such as diacyl peroxides, alkyl peresters, dialkyl peroxides, peroxydicarbonates, inorganic peroxides or else azo compounds.

In principle all organic solvents are suitable for preparing the polyacrylates. The solvents can be used in any desired amounts, preferably in amounts of <20% by weight, based on the total sum of the monomers, in order to give low solvent contents in the dispersion. Preference is given to a solvent mixture comprising a hydrophobic solvent, such as solvent naphtha, toluene, xylene, Kristalloel, for example, and a hydrophilic solvent, such as butylglycol, butyldiglycol, diethylene glycol, propylene glycol monomethyl ether or dipropylene glycol monomethyl ether.

The secondary polyacrylate dispersions can be prepared in principle by any prior art process, examples being feed processes and batch processes, or else in cascade processes.

Preferred secondary, hydroxy-functional polyacrylate dispersions A1) are obtainable by reacting a mixture of
a) 30% to 85% by weight of (meth)acrylic esters having $C_1$ to $C_{18}$ aliphatic hydrocarbon radicals in the alcohol moiety and/or vinylaromatics,
b) 5% to 35% by weight of hydroxy-functional (meth)acrylic esters,
which are reacted to give a hydrophobic polymer, and, following the addition of a) and b), a mixture of
c) 4% to 20% by weight of (meth)acrylic esters having $C_1$ to $C_{18}$ aliphatic hydrocarbon radicals in the alcohol moiety and/or vinylaromatics,
d) 4% to 15% by weight of hydroxy-functional (meth)acrylic esters and
e) 1% to 5% by weight of acid-functional monomers, such as acrylic acid or methacrylic acid
is metered in and polymerized to give a hydrophilic polymer, and, in parallel to the addition of a), b), c), d), and e), initiators are metered in, in amounts of 0.5% to 6.5% by weight, the sum of the percentages of a), b), c), d) and e) being 100% by weight.

As solvent it is preferred to use a mixture of a hydrophilic solvent, butylglycol for example, and a hydrophobic solvent, solvent naphtha for example.

After the end of the polymerization reaction the polymer solution is dispersed in water or by addition of water. The neutralization of the acid groups with amine(s) and/or bases and hence their conversion into salt groups may take place prior to dispersing or in parallel, by addition of the neutralizing amine together with the dispersing water, or by addition in parallel to the dispersing water. The degree of neutralization can be between 50% and 150%, preferably between 60% to 120%.

After dispersing has taken place, a proportion or the entirety of the solvent used can be removed by distillation.

Preferred neutralizing amines are dimethylethanolamine, ethyldiisopropylamine, methyldiethanolamine and 2-aminomethyl-2-methylpropanol.

The pH of the secondary polyacrylate dispersions is between 5 and 11, preferably between 6 and 10. The solids contents are between 20% and 60%, preferably between 35 and 55%, by weight. The average particle sizes of the dispersion are between 20 and 400 nm.

In the preparation of the secondary polyacrylate dispersions, instead of the solvents or together with the solvents, it is also possible to use what are called reactive diluents. Suitable reactive diluents are, for example, polyethers with a functionality of two and/or three that are liquid at room temperature, low-viscosity polyesters such as reaction products of 1 mol of a dicarboxylic acid such as, for example, dimer fatty acids or adipic acid with 2 mol of a diol or triol or 2 mol of Cardura® E 10 (glycidyl ester of Versatic acid, Hexion Specialities USA). Likewise suitable as reactive diluents are reaction products of caprolactone with low molecular mass alcohols. Also suitable are castor oil and other hydroxy-functional oils.

Suitable hydroxy-functional polyacrylate emulsions A1) are those which are prepared by known copolymerization processes in aqueous emulsion in the presence of suitable surface-active substances. Polyacrylate emulsions and their preparation are described for example in R. O. Athey jr., Emulsion Polymer Technology, Dekker, New York, 1991.

The monomers specified in connection with the preparation of the secondary polyacrylate dispersions are in principle also suitable for preparing polyacrylate emulsions.

Initiators in this context are either included in the initial charge and/or added in parallel, including, where appropriate, their addition with advance feed or delayed feed and/or extended feed. Examples of suitable initiators include redox systems, peroxides, persulphates and/or azo compounds such as dibenzoyl peroxide, dicumene peroxide, cumene hydroperoxide, potassium peroxodisulphate, ammonium peroxodisulphate, azobisisobutyronitrile or di-tert-butyl peroxide. Redox initiators added may be, for example, iron(II) ions.

Preferred polyacrylate emulsions A) are obtained by emulsion polymerization in water, in the presence of initiators and surface-active substances, of a) 10% to 40% by weight of hydroxy-functional (meth) acrylic esters,
b) 40% to 90% by weight of (meth)acrylic esters with aliphatic $C_1$ to $C_{18}$ hydrocarbon radicals in the alcohol moiety and/or vinylaromatics,
c) 0% to 5% by weight of acid-functional monomers, such as acrylic acid or methacrylic acid,
d) 0% to 25% by weight of other monomers such as acrylonitrile, vinyl acetate and vinylpyrrolidone, for example.

Also suitable as component A1) are hybrid forms of polyacrylate dispersions, such as polyester-polyacrylate dispersions. These dispersions contain both polyacrylate segments and polyester segments and are prepared for example by carrying out, in the presence of polyesters, a free-radical (co)polymerization of monomers corresponding to those specified in connection with the preparation of secondary polyacrylate dispersions.

This reaction is carried out in bulk or, preferably, in organic solution. The polyester acrylate contains 10% to 75%, preferably 20% to 60%, by weight of polyester fractions.

Preferred hydroxy-functional polyester-polyacylate dispersions are obtained by free-radically initiated polymerization of a mixture composed of a) 20% to 70% by weight of (meth)acrylic esters with aliphatic $C_1$ to $C_{18}$ hydrocarbon radicals in the alcohol moity and/or vinylaromatics,
b) 3% to 35% by weight of hydroxy-functional (meth)acrylic esters,
c) 2% to 8% by weight of acid-functional monomers, such as acrylic acid or methacrylic acid, in the presence of d) 75% to 10% by weight of a hydroxy-functional polyester, which, where appropriate, by incorporation of components containing double bonds, has groups capable of graft polymerization.

Preferred initiators are di-tert-butyl peroxide and tert-butyl peroctoate. The initiators are used in amounts of 0.5% to 5% by weight. The reaction is carried out at 90 to 180° C.

The incorporated acid groups are partly or fully reacted with neutralizing amines, preference being given to dimethylethanolamine, ethyldiisopropylamine or 2-aminomethyl-2-methylpropanol. This is followed by dispersion in or with water.

Suitable polyurethane dispersions A2) are conventional, generally self-emulsifying polyurethanes or polyurethane/polyureas in aqueous form.

The polyurethanes become self-emulsifying through incorporation of ionic and/or nonionically hydrophilicizing groups into the polymer chain. There are a variety of ways in which the hydrophilic groups can be incorporated—for example, hydrophilic groups may be incorporated directly in the polymer chain, or they may be attached pendantly or terminally.

Suitable polyurethane dispersions can be prepared by preparation processes known to the person skilled in the art, in the melt or in organic solution, and then dispersed; where appropriate, the reaction referred to as chain extension for the purpose of increasing the molecular weight can be carried out in organic solution, in parallel to the dispersing step or after the dispersing step.

Typically the following raw materials are used, and reacted with one another, for the purpose of preparing suitable polyurethane dispersions A):

1) At least one NCO-reactive unit for incorporating hydrophilic groups into the polyurethane, such as hydroxycarboxylic acids, examples being dimethylolacetic acid, 2,2-dimethylolpropionic acid, 2,2-dimethylbutyric acid, 2,2-dimethylolpentanoic acid, dihydroxysuccinic acid, hydroxypivalic acid or mixtures of such acids, hydroxysulphonic acids, aminocarboxylic acids such as, for example, the Michael adducts of isophoronediamine or ethylenediamine with acrylic acid, aminosulphonic acids such as aminoethylethanesulphonic acid, for example, hydroxy- or amino-functional phosphonic acids and/or mono-, di- or tri-functional polyethylene oxide units of the molecular weight range 350 to 2500 g/mol, the use of mixtures of different hydrophilicizing agents also being possible. Component 1) is used in amounts such that stable aqueous dispersions are obtained.

Particularly suitable NCO-reactive units for incorporating hydrophilic groups are dimethylolpropionic acid, dimethylolbutyric acid, mono- or dihydroxy-functional polyethylene oxide units of the molecular weight range 350 to 2500, such as, for example, Polyether LB 25® (monohydroxy-functional polyether based on ethylene oxide, Bayer MaterialScience AG, DE), Carbowax®750 (monohydroxy-functional polyether based on ethylene oxide, Dow Chemicals, USA), Pluriol® A 500 (monohydroxy-functional polyether based on ethylene oxide, BASF AG, Ludwigshafen, Germany), and hydroxy- or amino-functional sulphonic acids and/or sulphonates.

2) At least one aliphatic and/or aromatic di- or polyisocyanate, examples being aliphatic isocyanates with a functionality of two or three, such as hexamethylene diisocyanate, butane diisocyanate, isophorone diisocyanate, 1-methyl-2, 4(2,6)-diisocyanatocyclohexane, norbornane diisocyanate, xylylene diisocyanate, tetramethylxylylene diisocyanate, hexahydroxylylene diisocyanate, nonane triisocyanate, and 4,4'-diisocyanatodicyclohexylmethane. Likewise suitable is the accompanying use of aromatic isocyanates such as 2,4(2,6)-diisocyanatotoluene or 4,4'-diisocyanatophenylmethane, and also higher molecular mass or oligomeric polyisocyanates of the molecular weight range 336 to 1500, based on the abovementioned aliphatic isocyanates. It is preferred to use 4,4'-diisocyanatodicyclohexylmethane and/or isophorone diisocyanate and/or hexamethylene diisocyanate and/or 1-methyl-2,4(2, 6)-diisocyanatocyclohexane. Particular preference is given to the use of isophorone diisocyanate and/or hexamethylene diisocyanate or of mixtures of 4,4'-diisocyanatodicyclohexylmethane with isophorone diisocyanate or hexamethylene diisocyanate.

3) At least one polyol component of the molecular weight range 500 to 18 000 g/mol, based on polyester, polyesteramide, polyacetal, polyether and/or polysiloxane and/or polycarbonate, having a functionality of 1 to 5, preferably of 2 to 2.5.

Suitable polyol components 3) for preparing the polyurethane dispersions A) may include the following:

Polyesterpolyols having an average functionality of 1.5 to 5. Particularly suitable are linear polyesterdiols or else polyesterpolyols with low degrees of branching, such as those preparable in a known way from aliphatic, cycloaliphatic or aromatic dicarboxylic and/or polycarboxylic acids and/or their anhydrides, such as succinic acid, glutaric acid, maleic acid, fumaric acid, adipic acid, pimelic acid, suberic acid, azelaic acid, sebacic acid, nonanedicarboxylic acid, decanedicarboxylic acid, dimer fatty acid, terephthalic acid, isophthalic acid, o-phthalic acid, tetrahydrophthalic acid, hexahydrophthalic acid or trimellitic acid or a mixture thereof, or mixtures of the stated acids with other dicarboxylic and/or polycarboxylic acids, with polyhydric alcohols such as ethanediol, di-, tri-, tetraethylene glycol, 1,2-propanediol, di-, tri-, tetrapropylene glycol, 1,3-propanediol, butane-1,4-diol, butane-1,3-diol, butane-2,3-diol, pentane-1,5-diol, hexane-1,6-diol, 2,2-dimethyl-1,3-propanediol, 1,4-dihydroxycyclohexane, 1,4-dimethylolcyclohexane, octane-1,8-diol, decane-1,10-diol, dodecane-1,12-diol or mixtures thereof, where appropriate with accompanying use of polyols of higher functionality such as trimethylolpropane or glycerol. Also suitable of course for preparing the polyesterpolyols, as polyhydric alcohols, are cycloaliphatic and/or aromatic dihydroxyl and polyhydroxyl compounds. In place of the free polycarboxylic acid it is also possible to use the corresponding polycarboxylic anhydrides or corresponding polycarboxylic esters of lower alcohols, or mixtures thereof, for preparing the polyesters.

It is also possible to make proportional, accompanying use of monofunctional carboxylic acids, such as benzoic acid, ethylhexanoic acid, soya oil fatty acid, peanut oil fatty acid, oleic acid, saturated $C_{12}$-$C_{20}$ fatty acids and/or mixtures thereof, and also cyclohexanol, isooctanol and fatty alcohols.

The polyesterpolyols can of course also be homopolymers or copolymers of lactones, obtained preferably by addition reaction of lactones or lactone mixtures such as butyrolactone, ε-caprolactone and/or methyl-ε-caprolactone with suitable starter molecules having a functionality of two and/or more, such as, for example, the low molecular mass polyhydric alcohols specified above as synthesis components for polyesterpolyols. The corresponding polymers of ε-caprolactone are particularly preferred.

Polycarbonates containing hydroxyl groups are also suitable as polyhydroxyl components, examples being those preparable by reacting diols such as 1,4-butanediol and/or 1,6-hexanediol and/or pentanediol with diaryl carbonates, diphenyl carbonate for example, or phosgene.

Examples of polyetherpolyols that may be mentioned are the polyadducts of styrene oxides, of ethylene oxide, propylene oxide, tetrahydrofuran, butylene oxide, epichlorohydrin, and also their coadducts and grafting products, and also the polyetherpolyols obtained by condensing polyhydric alcohols or mixtures thereof, and those obtained by alkoxylating polyfunctional alcohols, amines and amino alcohols.

Use may also be made of block copolymers based on the aforementioned polyols, such as polyether-polyesters or polycarbonate-polyesters or polycarbonate-polyethers.

It is preferred to use polyester polyols and/or polycarbonate polyols and/or $C_3$ and/or $C_4$ polyether polyols. Particular preference is given to using a combination of polyester polyol and polycarbonate polyol or of polycarbonate polyol and $C_4$ polyether polyol.

4) Where appropriate, low molecular mass (molecular weight <500 g/mol) diols, triols or tetraols such as 1,4-butanediol, 1,6-hexanediol, ethylene glycol, trimethylolpropane, neopentyl glycol, glycerol, pentaerythritol and/or amino alcohols such as diethanolamine, ethanolamine, diisopropanolamine or propanolamine, for example, including where appropriate in ethoxylated and/or propoxylated form.

5) Where appropriate, substances referred to as chain extenders, such as diamines and/or polyamines and/or amino alcohols, such as diethanolamine, 1,2-diaminopropane, 1,4-diaminobutane, 2,5-diamino-2,5-dimethylhexane, 1,5-diamino-2-methylpentane (Dytek® A, DuPont), 1,6-diaminohexane, 2,2,4- and/or 2,4,4-trimethyl-1,6-diaminohexane, 1,11-diaminoundecane, 1,12-diaminododecane or triaminononane, ethylenediamine, isophoronediamine, diethylenetriamine, hydrazine, adipic dihydrazide, hydroxyethylenediamine, bishydroxyethylethylenediamine, aminopropanol, aminoalkoxysilanes and mixtures thereof. It is also possible to carry out chain extension by proportional or complete reaction of the NCO groups of the prepolymers from 1), 2), 3) and 4) with water.

Preferred polyurethane dispersions A2) comprise as synthesis components 1) 0.5% to 10% by weight of at least one NCO-reactive unit containing at least one hydrophilic group,
2) 8% to 60% by weight of aliphatic and/or cycloaliphatic di- or polyisocyanates,
3) 20% to 90% by weight of at least one polyol component of the molecular weight range from 500 to 18 000 g/mol, having an average functionality of 2 to 3,
4) 0% to 8% by weight of low molecular mass diols and/or triols, and
5) 0% to 6% by weight of diamines and/or hydrazine and/or hydrazides and/or amino alcohols and/or water as chain extenders.

Particularly preferred polyurethane dispersions A2) comprise as synthesis components 1) 1.4% to 6.5% by weight of at least one NCO-reactive unit containing at least one carboxyl and/or carboxylate and/or sulphonate group, where appropriate in combination with a polyethylene oxide unit of the molecular weight range 350 to 2500 g/mol,
2) 15% to 50% by weight of aliphatic and/or cycloaliphatic diisocyanates,
3) 40% to 83% by weight of at least one polyol component of the molecular weight range 800 to 2400 g/mol, based on a polyester and/or polycarbonate and/or $C_3$ and/or $C_4$ ether,
4) 0% to 4% by weight of low molecular mass diols and/or triols such as hexanediol, butanediol, ethylene glycol, glycerol, trimethylolpropane and the reaction products thereof with 1 to 6 mol of ethylene oxide and/or propylene oxide, and
5) 0% to 4% by weight of diamines and/or hydrazine and/or hydrazides and/or amino alcohols and/or water as chain extenders, neutralizing agents for the carboxyl and/or sulphonic acid groups being present in amounts of 50 to 150 equivalents.

Typically, in the preparation of the polyurethane dispersions in the melt or in organic solution, the units 1), 2), 3) and, where appropriate, 4) are reacted to form an isocyanate-functional prepolymer, it being possible to carry out this in one reaction step or else, where appropriate, in two or more successive reaction steps, the isocyanate-functional prepolymer then being reacted alternatively in the melt, in organic solution or in aqueous dispersion with chain extender 5) to form a high molecular mass, water-dispersed or water-dispersible polyurethane. Where appropriate, the solvent used is subsequently removed by distillation, either in its entirety or proportionally. Suitable neutralizing amines are, for example, the amines specified in connection with the preparation of the secondary polyacrylate dispersions, and isocyanate-reactive neutralizing agents should not be added until after the chain extension reaction and the reaction of the isocyanate groups. Suitable solvents are acetone or methyl ethyl ketone, for example, which are typically removed by distillation, N-methylpyrrolidone or N-ethylpyrrolidone.

The reactions can also be carried out using catalysts that are common in polyurethane chemistry, such as dibutyltin dilaurate, dibutyltin oxide, tin dioctoate, tin chloride, and tertiary amines, for example, in order to accelerate the reactions and/or to obtain specific effects.

The polyurethane dispersions A2) present in the binder combination of the invention typically have solids contents of 25% to 60% by weight, pH values of 5.5 to 11 and average particle sizes of 20 to 500 nm.

Suitable hydroxy-functional polyester-polyurethane dispersions A3) are reaction products of
1) 2% to 7%, preferably 2% to 5% by weight of dimethylolpropionic acid and/or hydroxypivalic acid, where appropriate in combination with mono-, difunctional polyethylene oxide units such as, preferably, monohydroxyfunctional polyethers based on ethylene oxide, or methoxypolyethylene glycols,
2) 7% to 30%, preferably 8% to 22% by weight of a mixture comprising 1,6-hexamethylene diisocyanate and/or bis(4-isocyanatocyclohexane)methane and/or 1-methyl-2,4(2,6)-diisocyanatocyclohexane and/or 1-isocyanato-3,3,5-trimethyl-5-isocyanatomethylcyclohexane,
3) 60% to 91%, preferably 70% to 88% by weight of polyol components of the molecular weight range 500 to 8000 g/mol, based on polyester, polyesteramide, polyacetal, polyether, polysiloxane and/or polycarbonate, having a functionality of 1.8 to 5, preferably of 2 to 4, with 50%, preferably 75%, with particular preference 100% by weight of the polyol component being composed of at least one polyester, and
4) 0% to 5% by weight of low molecular weight (molecular weight<500 g/mol) diols, triols, tetraols and/or amino alcohols.

The components are reacted in organic solution or in the melt, where appropriate with the use of catalysts common in polyurethane chemistry and/or in the presence of non-reactive amines that act as neutralizing agents, such as triethylamine, ethyldiisopropylamine and N-methylmorpholine, for example, to give hydroxy-functional polyester-polyurethanes, which after the reaction of components 1), 2), 3) and 4) no longer contain any free isocyanate groups.

Subsequently, dispersion is carried out in or with water and, where appropriate, excess solvent is distilled off again.

Suitable neutralizing agents, which can be added before or during the dispersing step, are, for example, diethanolamine, dimethylethanolamine, methyldiethanolamine, ammonia or those specified in connection with preparation of the secondary polyacrylate dispersions.

Polyester-polyurethane dispersions A3) have solids contents of 25% to 55% by weight, pH values of 6 to 11 and average particle sizes of 10 to 350 nm.

Component B) comprises crosslinker resins such as, for example, amide- and amine-formaldehyde resins, phenolic resins, aldehyde resins and ketone resins, e.g. phenol-formaldehyde resins, resoles, furan resins, urea resins, carbamic ester resins, triazine resins, melamine resins, benzoguanamine resins, cyanamide resins, aniline resins, water-dilutable and water-dispersible melamine- and urea-formaldehyde condensation products.

Likewise highly suitable crosslinker resins B) are blocked polyisocyanates, based for example on hexamethylene diisocyanate, bis(4-isocyanatocyclohexane)methane, 1,3-diisocyanatobenzene, tetramethylene diisocyanate, methylpentamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 2,2-bis(4-isocyanatocyclohexyl)propane, 1,4-diisocyanatobenzene, 1-methyl-2,4(2,6)-diisocyanatocyclohexane, 2,4-diisocyanatotoluene, 2,6-diisocyanatotoluene, 4,4'-diisocyanatophenylmethane, 2,2'- and 2,4'-diisocyanatodiphenylmethane, p-xylylene diisocyanate, p-isopropylidene diisocyanate, 4-isocyanatomethyl-1,8-octane diisocyanate, p-xylylene diisocyanate and $\alpha,\alpha,\alpha',\alpha'$-tetramethyl-m- or -p-xylylene diisocyanate, and mixtures of these.

As will be appreciated, it is also possible, on the basis of the polyisocyanates exemplified, to use the polyisocyanates known per se in polyurethane chemistry that have a higher functionality and contain uretdione groups and/or carbodiimide groups and/or allophanate groups and/or isocyanurate groups and/or urethane groups and/or iminooxadiazinedione groups and/or oxadiazinetrione groups and/or biuret groups as blocked crosslinker resins.

Mixtures of different diisocyanates and/or polyisocyanates can also be used.

Possible suitable blocking agents for the polyisocyanate crosslinkers are as follows: monoalcohols such as methanol, ethanol, butanol, hexanol and benzyl alcohol, for example, oximes such as acetoxime and methyl ethyl ketoxime, for example, lactams such as caprolactam, for example, phenols, CH-acidic compounds such as acetoacetic esters, for examples, or malonic esters such as diethyl malonate, for example, dimethylpyrazole, and amines such as tert-butylbenzylamine, triazole, dimethyltriazole, dicyclohexylamine or diisopropylamine for example.

Amino crosslinker resins are used with preference, likewise preferably in combination with blocked polyisocyanates.

In another embodiment of the present invention the aqueous coating compositions of the invention comprise
C) one or more dispersions selected from the group consisting of polyurethane dispersions C1), polyacrylate emulsions C2) or polyurethane-polyacrylate dispersions C3).

Preferred binder combinations are characterized in that as component C) a dispersion is used that dries physically in less than 30 minutes at temperatures of 20° C. and atmospheric humidities of up to 75%. Particular preference is given in this context to non-hydroxy-functional polyurethane dispersions C1), C1) being the same as A2). The polyurethane dispersion is preferably prepared on the basis of aliphatic polyisocyanates as described for A2). It is also possible to make use as component C) of a mixture of the stated dispersions C1), C2) and C).

A dispersion is considered to be physically drying at room temperature if, after the drawing-down of a film, the volatile components evaporate to leave a tack-free film. Preference is given in this context to those dispersions C) which dry physically within less than an hour, and more preferably within less than 30 minutes, at room temperature.

Suitable polyacrylate emulsions C2) are those described under A1).

Polyurethane-polyacrylate dispersions C3) can be obtained by carrying out, in the presence for example of a polyurethane dispersion, a free-radically initiated emulsion polymerization of (meth)acrylic esters, (meth)acrylic acid, hydroxyalkyl (meth)acrylates, styrene and, if desired, other monomers. In the course of the polymerization there may be grafting reactions onto the polyurethane. It is also possible, by incorporation of unsaturated compounds into the polyurethane, for example, to carry out specifically grafting reactions and also copolymerization reactions between polyurethane and polyacrylate. It is also possible to prepare the polyurethane in the presence of unsaturated monomers such as styrene, butyl acrylate and/or methyl methacrylate, for example, and to carry out polymerization of the monomers after the dispersing operation.

Particularly preferred polyurethane dispersions C1) comprise reaction products of:
1) 1.4% to 6.5% by weight of dimethylolpropionic acid, where appropriate in combination with a polyethylene oxide unit of the molecular weight range 750 to 2500 g/mol,
2) 15% to 35% by weight of hexamethylene diisocyanate and/or isophorone diisocyanate and/or bis(4-isocyanatocyclohexane)methane and/or 1-methyl-2,4(2,6)-diisocyanatocyclohexane,
3) 45% to 80% by weight of at least one polyol component of the molecular weight range 840 to 2400, based on a polyester and/or polycarbonate and/or $C_3$ or $C_4$ ether,
4) 0% to 3% by weight of hexanediol, butanediol, neopentyl glycol, glycerol and/or trimethylolpropane,
5) 0% to 2.5% by weight of diamines and/or amino alcohols and/or water as chain extenders,
with the inclusion of neutralizing agents for the in amounts of 50 to 125 equivalents, based on the amounts of the carboxyl and sulphonic acid groups, and no organic solvents being present.

The coating compositions of the invention comprise
A) 15% to 90%, preferably 25% to 85% by weight of an aqueous binder mixture,
B) 5% to 40%, preferably 9% to 32% by weight of at least one crosslinker and
C) 5% to 65%, preferably 20% to 55% by weight of one or more dispersions selected from the group consisting of polyurethane dispersions C1), polyacrylate emulsions C2) or polyurethane-polyacrylate dispersions C3),
the percentages for A), B) and C) adding up to 100% by weight.

Likewise an embodiment of the present invention are the aqueous coating compositions of the invention comprising
C) one or more dispersions selected from the group consisting of polyurethane dispersions C1), polyacrylate emulsions C2) or polyurethane-polyacrylate dispersions C3) and
D) a water-dilutable, hydroxy-functional polyester resin.

A further embodiment of the present invention are the aqueous coating compositions of the invention comprising
D) a water-dilutable, hydroxy-functional polyester resin.

Water-dilutable polyesters suitable as component D) are dispersing resins which possess very good pigment wetting or pigment affinity. Component D) has acid numbers in the range from 25 to 75 mg KOH/g solids and/or hydroxyl group contents of 2.5% to 10% by weight and/or molecular weights in the range from 750 to 5000 g/mol and/or fatty acid constituents in amounts of 15% to 50% by weight.

Preferred dispersing resins D) are water-dilutable polyesters prepared by reacting
1) 30% to 62% by weight of diols selected from the group of hexanediol, neopentyl glycol, diethylene glycol, ethylene glycol, propane-1,2-diol, propane-1,3-diol and/or 1-butanediol with
2) 5% to 20% by weight of triols and/or tetraols selected from the group of trimethylolpropane, glycerol and/or pentaerythritol, with
3) 30% to 62% by weight of dicarboxylic acids selected from the group of phthalic anhydride, isophthalic acid, hexahydrophthalic acid, tetrahydrophthalic acid and/or adipic acid, with subsequent reaction of the polyester with
4) 3% to 15% by weight of an anhydride, preferably trimellitic anhydride,
the percentages adding up to 100% by weight and some or all of the acid groups being converted into the salt form by reaction with neutralizing amines.

The coating compositions of the invention comprise
A) 15% to 89.5%, preferably 25% to 85% by weight of an aqueous binder mixture,
B) 5% to 40%, preferably 10% to 30% by weight of at least one crosslinker,
C) 5% to 65%, preferably 20% to 50% by weight of one or more dispersions selected from the group consisting of polyurethane dispersions C1), polyacrylate emulsions C2) or polyurethane-polyacrylate dispersions C3) and
D) 0.5% to 30%, preferably 0.5% to 15% by weight of a water-dilutable, hydroxy-functional polyester resin,
the percentages for A), B), C) and D) adding up to 100% by weight.

In a further embodiment the coating compositions of the invention may comprise
A) 30% to 94.5%, preferably 55% to 90% by weight of an aqueous binder mixture,
B) 5% to 40%, preferably 10% to 30% by weight of at least one crosslinker and
D) 0.5% to 30%, preferably 0.5% to 15% by weight of a water-dilutable, hydroxy-functional polyester resin,
the percentages for A), B) and D) adding up to 100% by weight.

Suitable polyester dispersions and solutions D) are obtained by reacting hydroxy-functional polyesters, prepared by reacting alcohols having a functionality of one, two and/or more and carboxylic acids and/or their anhydrides, with elimination of water, with acid anhydrides such as phthalic anhydride, hexahydrophthalic anhydride, tetrahydrophthalic anhydride, maleic anhydride, trimellitic anhydride and pyromellitic anhydride, for example, at 60 to 200° C., preferably at 120 to 180° C., in such a way that the acid anhydrides are reacted with a portion of the hydroxyl groups, with accompanying ring opening of the anhydride and incorporation into the polyester. This gives hydroxy-functional and carboxy-functional polyesters which, following proportional or complete neutralization of the carboxyl groups, can be dispersed or dissolved in water. The aqueous polyester solutions have average particle sizes of 10 to 200 nm, preferably of 25 to 100 nm.

Examples of suitable raw materials for preparing the hydroxy-functional polyesters are diols such as ethylene glycol, butylene glycol, diethylene glycol, triethylene glycol, polyalkylene glycols such as polyethylene glycol, and also propanediol, butane-1,4-diol, hexane-1,6-diol, neopentyl glycol or neopentyl glycol hydroxypivalate, the three last-mentioned compounds being preferred. Examples of polyols that may be used as well where appropriate include trimethylolpropane, glycerol, erythritol, pentaerythritol, trimethylolbenzene or trishydroxyethyl isocyanurate. Examples of suitable dicarboxylic and polycarboxylic acids include the following: phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid, trimellitic acid or pyromellitic acid. Anhydrides of these acids, where they exist, are likewise employable. For the purposes of the present invention, therefore, the anhydrides are embraced by the expression "acid". Monocarboxylic acids can be used in addition, as well. Suitable monocarboxylic acids are coconut oil fatty acid, soya oil fatty acid, safflower oil fatty acid, castor fatty acid, ricinene acid, peanut oil fatty acid, tall oil fatty acid or conjuene fatty acid, benzoic acid, tert-butylbenzoic acid, hexahydrobenzoic acid, 2-ethylhexanoic acid, isononanoic acid, decanoic acid or octadecanoic acid, for example.

It is also possible to use ε-caprolactone in addition when preparing the polyesters.

The hydroxy-functional polyesters are prepared by polycondensation of the stated raw materials, with the use where appropriate of suitable esterification catalysts, and are then reacted with an acid anhydride. The polyester thus prepared is dissolved in a solvent or solvent mixture and admixed with neutralizing agent.

Dispersing or dissolving in water may take place directly after the preparation of the polyester and reaction with the acid anhydride, or else later on.

One preferred polyester composition for a polyester dispersion or polyester solution D) is synthesized from a) 30% to 62%, preferably 30% to 50% by weight of diols selected from the group of hexanediol, butanediol, ethylene glycol, diethylene glycol and/or neopentyl glycol,
b) 5% to 20%, preferably 6% to 15% by weight of triols and/or tetraols, preferably trimethylolpropane and/or glycerol,
c) 30% to 62%, preferably 33% to 58% by weight of dicarboxylic acids and/or their anhydrides, selected from the group of phthalic anhydride, isophthalic acid, tetrahydrophthalic acid, terephthalic acid and/or adipic acid,
d) 0% to 30%, preferably 0% to 20% by weight of monocarboxylic acids and/or caprolactone, and
e) 3% to 15%, preferably 5% to 12% by weight of acid anhydride, selected from the group of trimellitic anhydride, tetrahydrophthalic anhydride and/or phthalic anhydride.

The polyurethane dispersions A2)/C1) typically have average molecular weights Mn, as determinable by gel chromatography, of >10 000 g/mol, preferably >30 000 g/mol. The polyurethane dispersions frequently contain, proportionally, very high molecular weight fractions, which are no longer fully soluble in organic solvents, and which in that case elude a molecular weight determination.

The polyester-polyurethane dispersions A3) typically have average molecular weights Mn, as determinable by gel chromatography, for example, of 1500 to 8000 g/mol.

The polyester dispersions or solutions D) typically have average molecular weights Mn, as determinable by gel chromatography for example, of 7500 to 5000, preferably of 1000 to 3500 g/mol.

The coating compositions of the invention are especially suitable for producing anti-chip base coats. Alternatively they can be used to prepare any desired clear, pigmented or else matt coating materials for single-coat or multi-coat application.

The coating compositions of the invention are suitable, for example, for automotive finishing or for soft-feel coating. Suitable substrates in these applications are plastic, wood, metal, mineral substrates, textiles, leather and/or glass.

The coating compositions of the invention can also be used for producing any desired clear, pigmented or else matt coating materials for any of a very wide variety of applications, these coating materials being intended for single-coat or multi-coat application.

The present invention hence also provides a coating system comprising a substrate and at least one coat consisting of the aqueous coating compositions of the invention.

The paints and coatings prepared from the coating compositions of the invention may where appropriate comprise further binders, reactive diluents and polymers having unsaturated groups which can be cured by means of UV light, organic and/or inorganic pigments, carbon blacks, fillers, further solvents, thickeners, Theological additives, organic or inorganic nanoparticles based for example on silicon, zinc, titanium, barium, calcium, magnesium, etc., additives for improving pigment wetting, for defoaming, for improving flow, gloss or adhesion, for preventing or reducing yellowing or the harmful effects of UV light.

Application is possible by spraying, pouring, dipping, rolling, brushing and roller-coating.

EXAMPLES

Components Employed

Raw Material A1) Bayhydrol® A 145:

Aqueous, hydroxy-functional, secondary polyacrylate dispersion. Solids content 45%, viscosity at 23° C. 1000 mPas, pH 8.0, acid number 10 mg KOH/g solids, OH content 1.5%, contains 4% each of butylglycol and solvent naphtha 100, Bayer MaterialScience AG, DE.

Raw Material A2) Bayhydrol® XP 621:

Aqueous, aliphatic, solvent-free polyurethane dispersion. Solids content 40%, viscosity at 23° C. 20" (DIN 4 cup, flow time); pH 7.5, average particle size (laser correlation spectroscopy) 100 nm, contains carboxylate groups, Bayer MaterialScience AG, DE.

Raw Material A3) Bayhydrol® PT 241:

Aqueous, hydroxy-functional, polyester-polyurethane dispersion. Solids content 41%, viscosity 1000 mPas, pH 8.3, acid number 7.5 mg KOH/g solids, OH content 1%, contains 5% of N-methylpyrrolidone, Bayer MaterialScience AG, DE.

Dispersion A):

Mixture of 50 parts of raw material A1), 15 parts of raw material A2) and 35 parts of raw material A3), based in each case on solids contents of the individual raw materials. Solids content 42.7%.

Crosslinker B):

Raw material B1) Cymel® 328:

Methylated melamine-formaldehyde crosslinker resin, in solution in water, Cytec Industries Inc., USA.

Raw Material B2) Cymel® 327:

Methylated melamine-formaldehyde crosslinker resin, in solution in isobutanol, Cytec Industries Inc., USA.

Raw Material C) Bayhydrol® XP 2621:

Aqueous, aliphatic, solvent-free polyurethane dispersion. Solids content 40%, viscosity at 23° C. 20" (DIN 4 cup, flow time); pH 7.5, average particle size (laser correlation spectroscopy) 100 nm, contains carboxylate groups, Bayer MaterialScience AG, DE.

Raw Material D) Bayhydrol® D 270:

Water-dilutable, hydroxy-functional polyester. Solids content 70% in water 11.5%, butylglycol 13.3%, dimethylethanolamine 5.2%. Viscosity at 23° C. 12 000 mPas, pH 8.0, OH content 2.0, acid number 35 mg KOH/g solids, average particle size 15 nm, Bayer MaterialScience AG, DE.

| | |
|---|---|
| BYK ® 347: | Polyether-modified siloxane, Byk Chemie, Wesel, Germany |
| Viscalex ® HV 30, 30% as-supplied form: | (Copolymer-based thickener, Allied Colloids LTD, United Kingdom |
| Disperbyk ® 190: | Pigment-stabilizing block copolymer, Byk Chemie, Wesel, Germany |
| Byk ® 011: | Defoamer; Byk Chemie, Wesel, Germany |
| Gasruβ FW 200 carbon black: | (Degussa AG, Frankfurt, Germany |
| Additol ® XL250: | Pigment wetting additive, Cytec Surface Specialities; USA |
| Bayhytherm ® 3146: | Polyurethane dispersion containing blocked isocyanate groups Bayer MaterialScience AG, Leverkusen, Germany. |
| Maprenal ® MF 904 melamine resin: | Ineos Melamins GmbH, Frankfurt, Germany |
| Marpenal ® MF ® 915 melamine resin: | Ineos Melamins GmbH, Frankfurt, Germany |
| Bayhytherm ® VP LS 2153: | Self-crosslinking polyurethane dispersion, Bayer MaterialScience AG; Leverkusen, Germany |

Example 1

Inventive

Preparation and testing of an inventive uni-black anti-chip base coat binder combination 1), whose binder component is composed of (based in each case on solids content) 48.5% of dispersion A), 30% of raw material C), 20% of raw material B2) and 1.5% of raw material D).

37 parts of dispersion A), 24 parts of raw material C), 7 parts of raw material B2), 4.7 parts of butylglycol, 0.5 parts of BYK®347, 0.9 parts of Viscalex®HV 30, 12 parts of distilled water and 3.3 parts of dimethylethanolamine, in 10% form in water, are introduced as an initial charge and are mixed at 2000 rpm by means of a dissolver with propeller stirrer, after which 10.5 parts of a pigment paste are added and the mixture is stirred at 4000 rpm for 30 minutes, followed by adjustment of the pH to 8.0 to 8.5. The pigment paste contains 4.5 parts of raw material D), 14.8 parts of dimethylethanolamine, in 10% form in water, 30 parts of Disperbyk®190, 0.9 parts of Byk®011, 17 parts of Gasruβ FW 200 and 32 parts of water, and is prepared by dispersing the constituents in the dissolver and subsequently carrying out dispersion in a bead mill for 30 minutes.

The aqueous uni-black anti-chip base coat 1) thus prepared has a pH of 8 to 8.5 and at a viscosity of 25 seconds (DIN 4 cup flow time at 23° C.) is applied to metal panels, coated with two different surfacers (type 1 and type 2), and is dried at 80° C. for 10 minutes, followed by application of a 2-component polyurethane top coat and curing at 140° C. for 30 minutes. For the purpose of comparison, a uni-colour base coat with OEM automotive line quality is subjected to the same testing.

TABLE 1

| Uni-black anti-chip base coat 1) | | |
|---|---|---|
| | Uni-black base coat OEM automotive line quality | Uni-black anti-chip base coat (Example 1) |
| on surfacer type 1 | | |
| Stone-chip resistance (VDA test)* | 1.5 | 1.5 |
| Adhesion of the anti-chip base coat to surfacer (1 = very good, 2 = good, 3 = poor) | 2 | 1-2 |
| Plane of principal separation on delamination** | surfacer/electrocoat | surfacer/electrocoat |
| DOI*** | 80 | 80-90 |

TABLE 1-continued

| Uni-black anti-chip base coat 1) | | |
|---|---|---|
| | Uni-black base coat OEM automotive line quality | Uni-black anti-chip base coat (Example 1) |
| on surfacer type 2 | | |
| Stone-chip resistance (VDA test)* | 2 | 1.5 |
| Adhesion of the anti-chip base coat to surfacer (1 = very good, 2 = good, 3 = poor) | 2 | 1-2 |
| Plane of principal separation on delamination** | surfacer/electrocoat | surfacer/electrocoat |
| DOI*** | 80 | 80-90 |

*VDA [German Carmakers Association] testing of the stone-chip resistance of coatings: Part 1: multi-impact testing in accordance with DIN 55996-1: 1 = very good, 5 = very poor
**Incidence of delamination under severe exposure: The anti-chip base coat adheres very well to the different types of surfacer, with delamination occurring only between the surfacer and the electrocoat (= plane of principal separation)
***The determination of the DOI (distinction of image) is a gloss measurement close to the reflection angle, describing the top coat holdout, and is carried out in what is called a glow box. The values obtained are relative numbers (0-100). The higher the DOI, the better the paint quality and the greater the distinctness of the image of high-contrast objects through reflection on the painted surface. Values of 80 or more than 80 are very good values.

The anti-chip base coat 1) meets all of the requirements of automotive finishing. The quality is largely independent of the type of substrate or of surfacer, the film-optical properties and the anti-stone-chip properties are excellent, and the adhesion is better than that of the automotive line quality tested for comparison.

Example 2

Inventive

Preparation and testing of an inventive uni-black anti-chip base coat binder combination 2) whose binder component is composed of (based in each case on solids content) 84% of dispersion A), 15% of raw material B2) and 1% of raw material D).

60.7 parts of dispersion A, 7.2 parts of crosslinker raw material B2), 4.8 parts of butylglycol, 0.5 parts of Byk®347, 1 part of Viscalex®HV30, 12 parts of distilled water and 3 parts of 10% strength aqueous dimethylethanolamine solution are stirred at 2000 rpm in the dissolver for 10 minutes, after which 10.7 parts of a pigment paste consisting of 4.6 parts of raw material D), 14.9 parts of a 10% strength aqueous solution of dimethylethanolamine, 30 parts of Disperbyk®190, 17 parts of Gasruβ FW 200 and 32.42 parts of distilled water are added and the mixture is stirred at 4000 rpm for about 30 minutes.

The uni-black anti-chip base coat 2) has an application viscosity of 25 seconds (DIN 4 flow cup/23° C.), a pH of about 8 and a solids content of 30.6%. It is applied to a metal panel, coated with a polyurethane surfacer, then is dried at 80° C. for 10 minutes, is subsequently overcoated with a 2-component polyurethane top coat customary in the automotive industry, and is cured at 140° C. for 30 minutes.

Example 3

Inventive

As Example 2), but the proportions are 69.5% of dispersion A), 29.5% of raw material B2) and 1% of raw material D).

The aqueous uni-black anti-chip base coat 3) has a solids content of 32.5% and is applied with a viscosity of 25 seconds (DIN 4 cup flow time at 23° C.) to a metal panel, which has been coated with a polyurethane surfacer, and is dried at 80° C. for 10 minutes, after which a 2-component polyurethane topcoat is applied and curing is carried out at 140° C. for 30 minutes.

The test results obtained were as follows:

TABLE 2

Uni-black anti-chip base coat 3)

| | Uni-black anti-chip base coat | |
|---|---|---|
| | Example 2 | Example 3 |
| Application viscosity | 25 s | 25 s |
| Solids content | 30.6% | 32.5% |
| DOI (visual) | 80-90 | 80-90 |
| Stonechip resistance (VDA test) | 1.5 | 1.5 |
| Adhesion of anti-chip base coat to surfacer (1 = very good, 2 = good, 3 = poor) | 1-2 | 1-2 |
| Plane of principal separation on delamination** | surfacer/electrocoat | surfacer/electrocoat |

Example 4

Inventive

Preparation of an Inventive Silver-Metallic Anti-Chip Base Coat Composed of 49 parts of dispersion A), 29 parts of raw material C), 19 parts of raw material B1) and 2 parts of raw material D), in each case based on binder solids.

17.5 parts of dispersion A), 11.2 parts of raw material C), 19 parts of distilled water, 3.3 parts of butylglycol, 4.5 parts of dimethylethanolamine, in 10% form in water, are stirred in a dissolver at 2000 rpm for 10 minutes, then 2.8 parts of Viscalex®HV30 and 19 parts of distilled water are added and the mixture is again stirred in the dissolver at 2000 rpm for 10 minutes, after which 3.5 parts of raw material B1), 3.3 parts of butylglycol and 4.2 parts of distilled water are added and stirring is continued in the dissolver for 10 minutes more, then 11.7 parts of a metallic paste are added and the composition is stirred at 4000 rpm for 30 minutes. After that the pH is adjusted to 8 to 8.5.

The metallic paste is prepared by mixing 41.9 parts of butylglycol, 2.9 parts of raw material D), 4.3 parts of Additol®XL250, 50.6 parts of Stapa Hydrolan® 2156 No. 55900/G aluminium and 0.23 parts of dimethylethanolamine in a dissolver at 4000 rpm for 30 minutes.

The anti-chip base coat 4) has a solids content of 18.7% and an application viscosity of about 40 seconds (DIN 4 flow cup). It is applied by spraying to a metal panel, which has been coated with electrocoat and surfacer (type a), and is dried at 80° C. for 10 minutes, then overcoated with a 60% 2-component PU clear coat based on a hydroxy-functional polyester-polyacrylate and on a low-viscosity, HDI-based polyisocyanate, and is cured at 140° C. for 30 minutes. The dry film thicknesses are about 15 μm for the base coat and about 40 μm for the clear coat.

The type a) surfacer contains as its binder components a water-dilutable, hydroxy-functional polyester (Bayhydrol® D270), a polyurethane dispersion containing blocked isocyanate groups (Bayhytherm®3146), and the amino crosslinker resins Maprenal®MF 904 and Marpenal®MF915 in a ratio of 30:55:7.5:7.5.

Example 5

Inventive

A silver-metallic anti-chip base coat is prepared as described in Example 4, from 29 parts of dispersion A), 49 parts of raw material C), 20 parts of raw material B1) and 2 parts of raw material D).

The anti-chip base coat 5) has a solids content of 15.9% and an application viscosity of about 40 seconds (DIN 4 flow cup). It is applied by spraying to a metal panel, which has been coated with electrocoat and surfacer (type a), and is dried at 80° C. for 10 minutes, then overcoated with a 60% 2-component PU clear coat based on a hydroxy-functional polyester-polyacrylate and a low-viscosity, HDI-based polyisocyanate, and is cured at 140° C. for 30 minutes. The dry film thicknesses are about 15 μm for the base coat and about 40 μm for the clear coat.

The test results obtained were as follows:

TABLE 3

Silver-metallic anti-chip base coat

| | Silver metallic anti-chip base coat (on surfacer type a) | |
|---|---|---|
| | Ex. 4 | Ex. 5 |
| Application viscosity | 40 s | 40 s |
| Solids content | 18.7% | 15.9% |
| Flip flop value (X-rite) | | |
| Delta 25°/75° | 66.5 (107.8/52.1) | 68.3 (108/39.7) |
| Delta 15°/110° | 95.8 (129.5/33.7) | 103.8 (137.3/33.5) |
| Testing in the paint system: | | |
| Stone chip resistance (VDA test*) | 1-1.5 | 1-1.5 |
| Adhesion of anti-chip base coat to surfacer (1 = very good, 2 = good, 3 = poor) | 1-2 | 1-2 |
| Plane of principal separation on delamination** | surfacer/electrocoat | surfacer/electrocoat |

*1 = very good, 5 = very poor
**On severe exposure, the delamination occurs between surfacer and electrocoat. The anti-chip base coat adheres very well to the surfacer; the plane of principal separation for the delamination is the surfacer/electrocoat plane.

Experiments 4) and 5) are repeated with a different surfacer (type b) based on Bayhydrol® D270, Bayhytherm® 3146, Bayhytherm® VP LS 2153 and Cymel® 327 in a ratio of 20:32.5:32.5:15.

The test results obtained are as follows:

TABLE 4

Silver-metallic anti-chip base coat

| | Silver metallic anti-chip base coat (on surfacer type b) | |
|---|---|---|
| | Example 4 | Example 5 |
| Application viscosity | 40 s | 40 s |
| Solids content | 18.7% | 15.9% |
| Testing in the paint system: | | |
| Stone chip resistance (VDA test*) | 1-1.5 | 1 |
| Adhesion of base coat to surfacer (1 = very good, 2 = good, 3 = poor) | 1-2 | 1-2 |
| Plane of principal separation on delamination** | surfacer/electrocoat | surfacer/electrocoat |

*Scale from 0 to 5; 1 = very good, 5 = very poor
**On severe exposure the delamination occurs between surfacer and electrocoat; the anti-chip base coat adheres very well to the surfacer Independently of the nature of the substrate, anti-chip base coats are obtained which exhibit not only excellent film-optical values and metallic effects but also excellent anti-stone-chip resistance and adhesion values. All of the coatings display very good resistances to water exposure and, overall, exhibit excellent film-optical qualities. The corresponding paint formulations are stable on storage.

The binder combinations of the invention are especially suitable for producing anti-chip base coats and make it possible to reduce the four-paint coat system commonly used in automotive finishing, consisting of primer, anti-stone-chip surfacer, base coat and top coat, to a three-layer system consisting of primer, anti-chip base coat and clear coat. This provides a possibility for substantial reduction in the costs of finishing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous coating compositions comprising:
   an aqueous binder mixture A) comprised of:
   A1) 25% to 70% by weight of a secondary, hydroxy-functional polyacrylate dispersion or a secondary, hydroxy-functional polyacrylate emulsion having a solids content of between 20% and 60% by weight,
   A2) 5% to 50% by weight of an aliphatic polyurethane dispersion having a solids content of between 25% and 60% by weight, and
   A3) 20% to 70% by weight of a hydroxy-functional polyester-polyurethane dispersion composed to an extent of at least 75% by weight of a polyester of molecular weight 500 to 2,500 g/mol and having a solids content of between 25% and 55% by weight,
   wherein the percentages by weight of A1), A2) and A3) are based on the aqueous binder mixture A); and
   B) at least one crosslinker,
   necessarily including one component A1) and/or A3) in an amount of at least 35% by weight.

2. Aqueous coating compositions according to claim 1, having an organic solvent content of 2% to 12% by weight.

3. Aqueous coating compositions according to claim 1, wherein component B) is amino crosslinker resin(s).

4. Aqueous coating compositions according to claim 1, wherein component B) is a combination of amino crosslinker resins and polyisocyanates.

5. Aqueous coating compositions according to claim 1, further comprising
   C) one or more dispersions selected from the group consisting of polyurethane dispersions C1), polyacrylate emulsions C2) or polyurethane-polyacrylate dispersions C3).

6. Aqueous coating compositions according to claim 5, comprising
   A) 15% to 90% by weight of an aqueous binder mixture,
   B) 5% to 40% by weight of at least one crosslinker and
   C) 5% to 65% by weight of one or more dispersions selected from the group consisting of polyurethane dispersions C1), polyacrylate emulsions C2) or polyurethane-polyacrylate dispersions C3),
   the percentages for A), B) and C) adding up to 100% by weight.

7. Aqueous coating compositions according to claim 1, further comprising
   C) one or more dispersions selected from the group consisting of polyurethane dispersions C1), polyacrylate emulsions C2) or polyurethane-polyacrylate dispersions C3), and
   D) a water-dilutable, hydroxy-functional polyester resin.

8. Aqueous coating compositions according to claim 7, comprising
   A) 15% to 89.5% by weight of an aqueous binder mixture,
   B) 5% to 40% by weight of at least one crosslinker and
   C) 5% to 65% by weight of one or more dispersions selected from the group consisting of polyurethane dispersions C1), polyacrylate emulsions C2) or polyurethane-polyacrylate dispersions C3) and
   D) 0.5% to 30% by weight of a water-dilutable, hydroxy-functional polyester resin, the percentages for A), B), C) and D) adding up to 100% by weight.

9. Aqueous coating compositions according to claim 5, wherein component C) is a physically drying dispersion.

10. Aqueous coating compositions according to claim 1, further comprising
    D) a water-dilutable, hydroxy-functional polyester resins.

11. Aqueous coating compositions according to claim 10, comprising
    A) 30% to 94.5% by weight of an aqueous binder mixture,
    B) 5% to 40% by weight of at least one crosslinker and
    D) 0.5% to 30% by weight of a water-dilutable, hydroxy-functional polyester resin, the percentages for A), B) and D) adding up to 100% by weight.

12. Aqueous coating compositions according to claim 7, wherein component D) has acid numbers in the range from 25 to 75 mg KOH/g solids and/or hydroxyl group contents of 2.5% to 10% by weight and/or molecular weights in the range from 750 to 5000 g/mol and/or fatty acid constituents in amounts of 15% to 50% by weight.

13. Anti-chip base coats comprising the aqueous coating compositions according to claim 1.

14. Paint system comprising a substrate and at least one coat composed of aqueous coating compositions according to claim 1.

15. The paint system according to claim 14, wherein the substrate is selected from the group consisting of plastics, wood, metal, mineral substrates, textiles, leather, glass and combinations thereof.

* * * * *